US006714168B2

(12) United States Patent
Berenbaum

(10) Patent No.: US 6,714,168 B2
(45) Date of Patent: Mar. 30, 2004

(54) FURNITURE PIECE FACILITATING WIRELESS LOCAL AREA NETWORK ACCESS

(75) Inventor: Alan David Berenbaum, New York, NY (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 10/196,165

(22) Filed: Jul. 17, 2002

(65) Prior Publication Data

US 2004/0012536 A1 Jan. 22, 2004

(51) Int. Cl.[7] ..................................................... H04Q 7/20

(52) U.S. Cl. ........................ 343/873; 455/446; 455/562

(58) Field of Search ................................. 343/713, 720, 343/722, 905, 797, 816, 854, 767; 455/446, 562, 41, 62, 63, 434, 525, 873

(56) References Cited

U.S. PATENT DOCUMENTS 3,604,007 A * 9/1971 Solby .......................... 343/720
5,815,811 A * 9/1998 Pinard et al. ............... 455/434
6,219,553 B1 * 4/2001 Panasik ....................... 455/446

* cited by examiner

*Primary Examiner*—James Clinger
(74) *Attorney, Agent, or Firm*—Harness, Dickey & Pierce, P.L.C.

(57) ABSTRACT

The furniture piece facilitating wireless Local Area Network (LAN) access has a work surface and at least one support supporting the work surface. An antenna is disposed in one of the work surface and the support, and an access point is disposed in one of the work surface and the support.

19 Claims, 3 Drawing Sheets

FURNITURE PIECE FACILITATING WIRELESS LOCAL AREA NETWORK ACCESS

BACKGROUND OF THE INVENTION

1. Field of the Invention

The present invention relates to furniture, and more particularly, a furniture piece that facilitates wireless local area network access.

2. Description of Related Art

Wireless Local Area Networks (LANs) are particularly useful in conference rooms and other group meeting situations. The wireless LAN allows users of many portable computers to connect to the network during a meeting, and removes the need for numerous unsightly wireline connections. A wireless LAN also eliminates the complexity of providing for numerous wireline connections.

However, assuring access to the wireless LAN in a group meeting place like a conference room, may require the installation of an antenna and associated access point (electronics package connected to the antenna) in the meeting place. An access point is a base station in a wireless network. The access point is wireline connected to the network and wirelessly communicates with the terminal stations (e.g., portable computers) accessing the network.

The installation of an access point in a group meeting place can itself be unsightly—typically the access point is mounted on the wall or ceiling. One proposed solution to this problem is to embed the antenna in a ceiling tile, and dispose the access point in the ceiling above the ceiling tile. However, placing the access point above the ceiling is not always feasible. Additionally, such an installation typically requires a professional contractor.

SUMMARY OF THE INVENTION

In the present invention, the antenna and access point are provided with a piece of furniture, such as the conference table. By simply putting the furniture piece in a particular room and attaching it to a single wireline connection, wireless Local Area Network (LAN) access is provided.

In one embodiment of the present invention, the antenna is embedded in the work surface of the furniture piece, and the access point is embedded in a support of the furniture piece. The furniture piece is, for example, a conference table.

In other embodiments, the antenna is embedded in either the work surface or a support of the furniture piece, and the access point is embedded in either the work surface or a support of the furniture piece.

In still other embodiments, the antenna and access piece are disposed in compartments formed in the furniture piece.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE EMBODIMENTS

Figure 1:
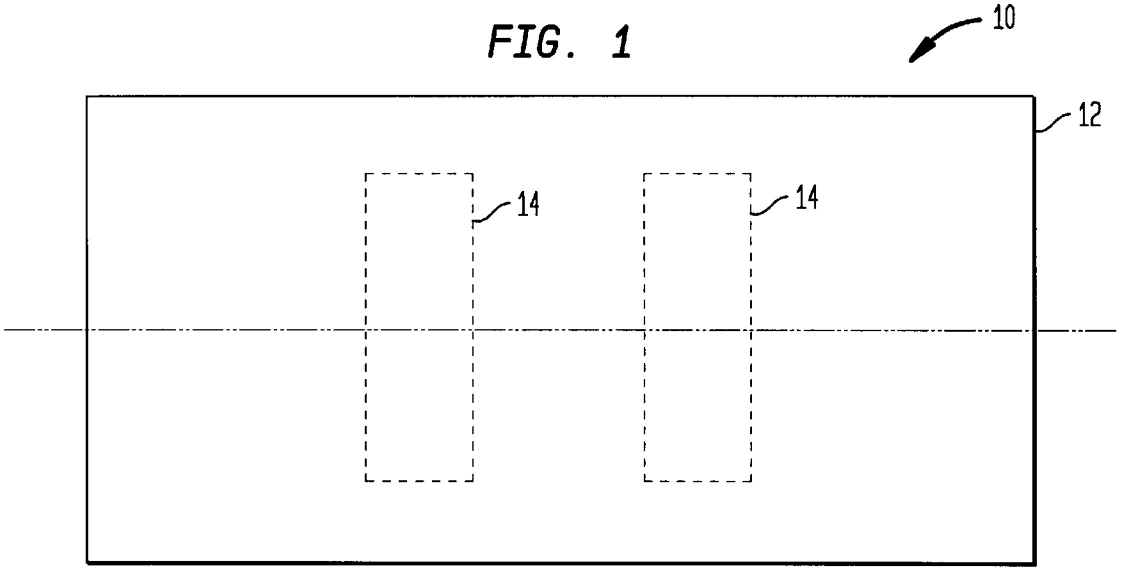
FIGS. 1 and 2 are top and cross-sectional views of a conventional conference room table.
Figure 2:
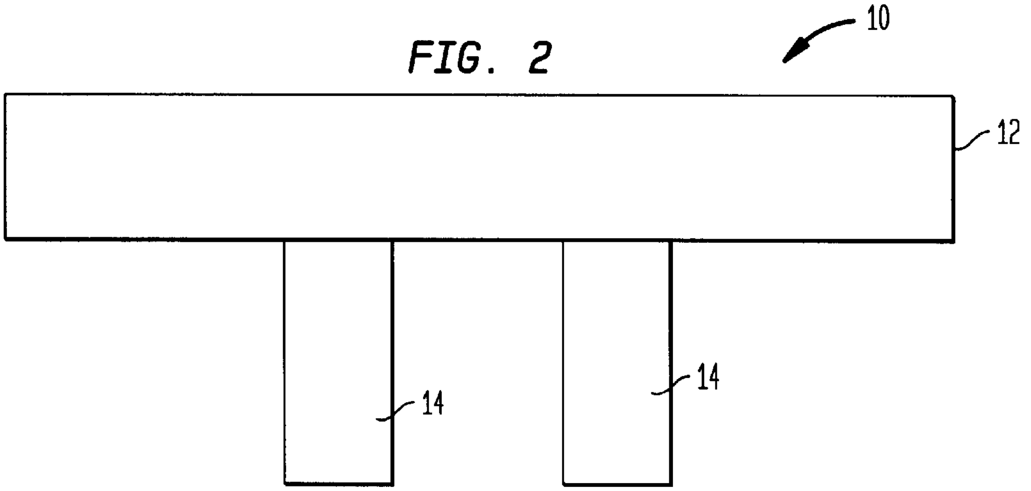

FIG. 1 is a top view of a conventional conference room table, and FIG. 2 is a cross sectional view of the conference room table along the line II—II. As shown, the conference table 10 includes a work surface 12 supported by two supports or legs 14.

Figure 3:
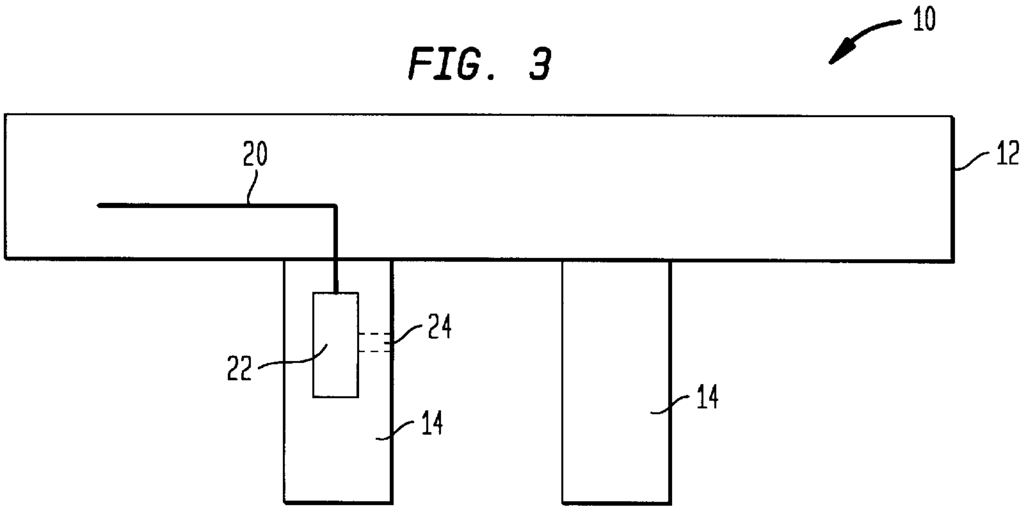
FIGS. 3–9 are cross-sectional views of embodiments of a conference table facilitating wireless Local Area Network (LAN) access according to the present invention.

FIGS. 3–6 are cross-sectional views along line II—II of embodiments of the conference table 10', which has been modified to facilitate wireless Local Area Network (LAN) access according to the present invention. As shown in FIG. 3, an antenna 20 is embedded in the work surface 12 of the conference table 10, and an access point 22 connected to the antenna 20 is embedded in one of the supports 14 of the conference table. The support 14 that includes the access point 22 also has an access port 24 formed therein. A power supply (not shown) and wireline LAN connection (not shown) are connected to the access point 22 via the access port 24.

Figure 4:
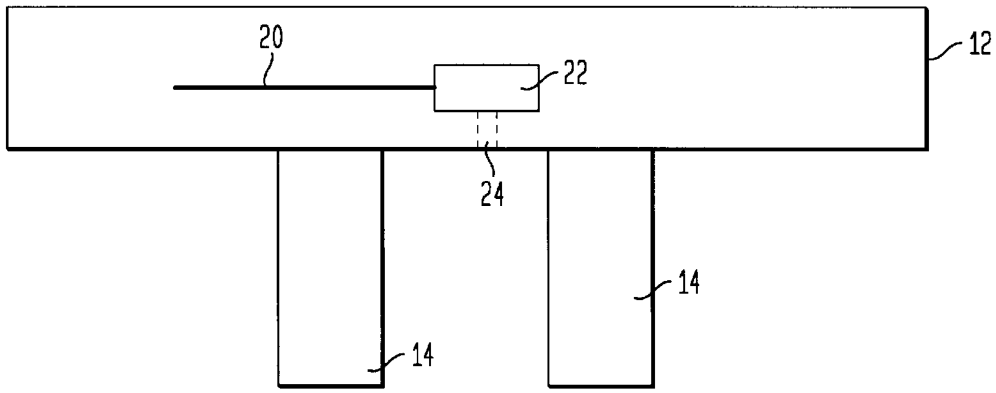
Figure 5:
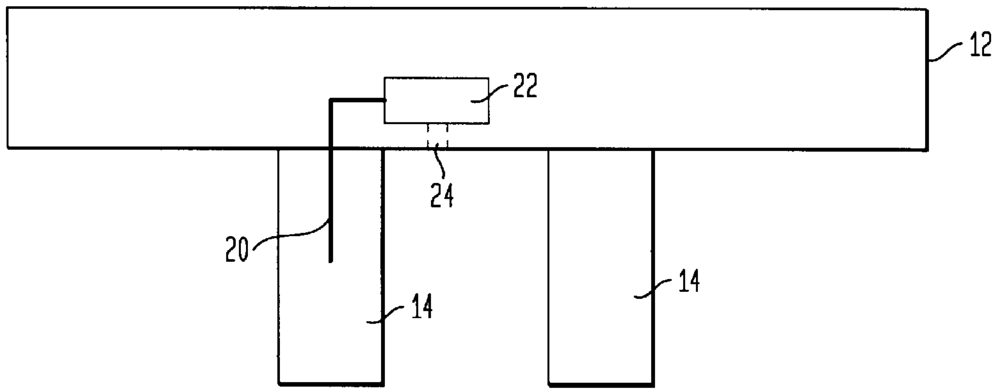
Figure 6:
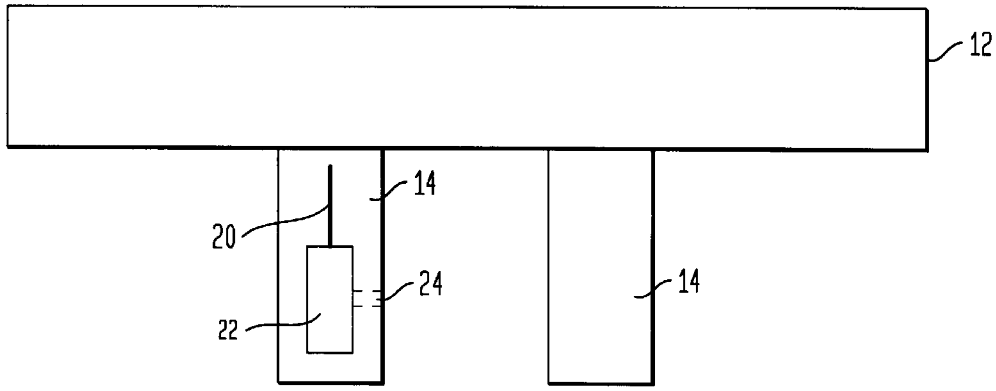

In the embodiment of FIG. 4, the antenna 20 and the access point 22 are embedded in the work surface 12. In this embodiment, the bottom of the work surface 12 includes the access port 24. In the embodiment of FIG. 5, the antenna 20 is embedded in one of the supports 14, and the access point 22 is embedded in the work surface 22. In this embodiment, the bottom of the work surface includes the access port 24. In the embodiment of FIG. 6, the antenna 20 and the access point 22 are embedded in the support 14. Accordingly, in this embodiment, the support 14 includes the access port 24.

It should be appreciated that while the embodiments of FIGS. 4 and 5 provide the access port 24 in the bottom of the work surface 12, the access port 24, in an alternative embodiment, can be provided in the top of the work surface 12. This is particularly useful with conference tables that provide power supply and/or wireline LAN connections on the work surface.

Figure 7:
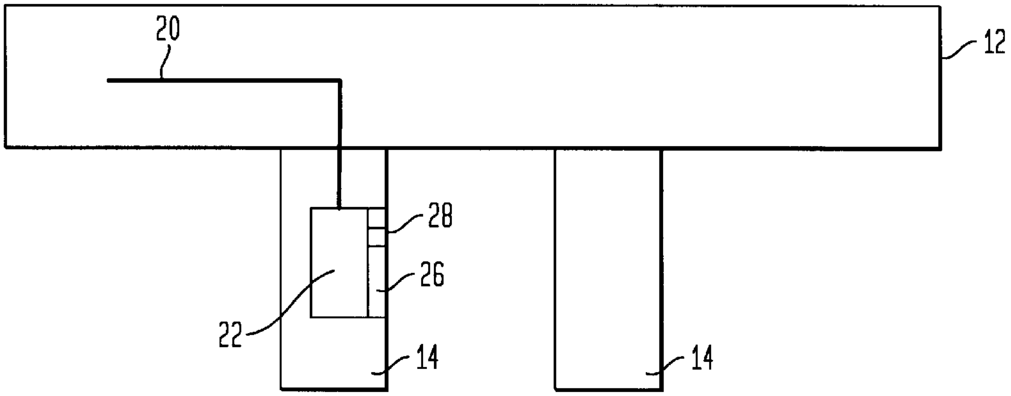

FIG. 7 illustrates another alternative embodiment of a conference table according to the present invention. Specifically, FIG. 7 illustrates an alternative to the embodiment of FIG. 3, but it will be appreciated that this alternative is equally applicable to the embodiments of FIGS. 4–6. As shown in FIG. 7, the antenna 20 is embedded in the work surface 12 and the access point 22 is embedded in the support 14. The support 14 further includes a removable access panel 26 that when removed provides complete access to the access point 22. The access panel 26 is press fit into the support 14 when installed. With the access panel 26 removed, the access point 22 can be serviced and maintained as needed. The access panel 26 also includes an access port 28 through which power and wireline LAN connections to the access point 22 are made.

Figure 8:
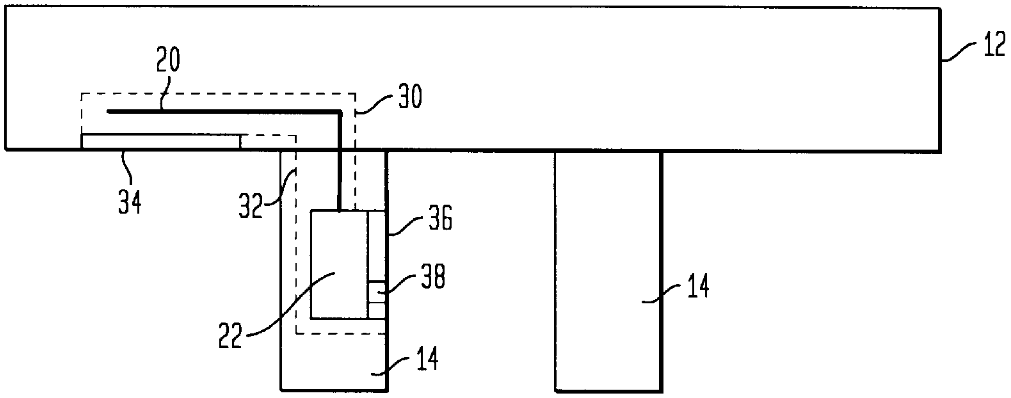

FIG. 8 illustrates a further embodiment of the present invention. As shown, the work surface 12 includes a first compartment 30 in which the antenna 20 is disposed. Also, the support 14 includes a second compartment 32 in which the access point 22 is disposed. The first and second compartments 30 and 32 are accessed through removable first and second access panels 34 and 36, respectively. The first and second access panels 34 and 36 are press fit into the work surface 12 and the support 14, respectively. The second access panel 36 includes an access port 38 through which power and wireline LAN connections to the access point 22 are made. With the first access panel 34 removed, the antenna can be serviced, maintained and/or replaced. With the second access panel 36 removed, the access point 22 can be serviced, maintained and/or replaced. And, while the antenna 20 and the access point 22 in the embodiment of FIG. 8 have the same arrangement as the embodiment of FIG. 3. The embodiment of FIG. 8 is equally applicable to the antenna 20 and access point 22 arrangements illustrated in the embodiments of FIGS. 4–6.

Figure 9:
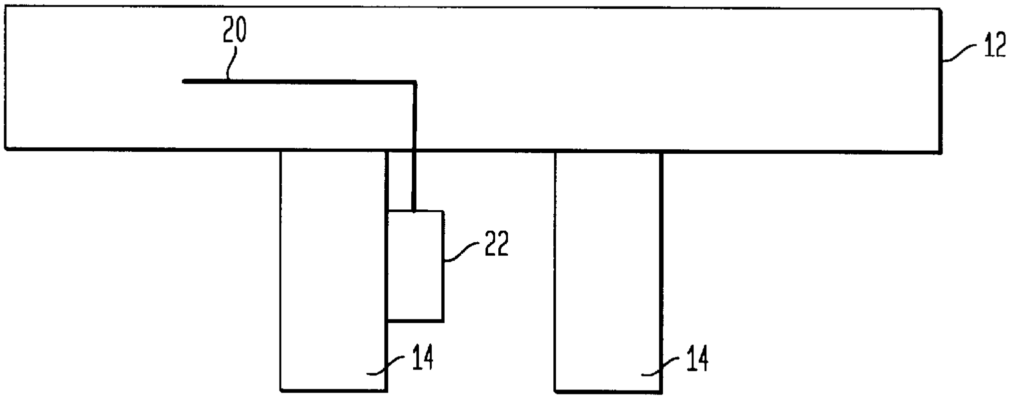

FIG. 9 illustrates another embodiment of the present invention. As shown, the antenna 20 is embedded in the work surface 12. The access point 22, connected to the antenna 20, is mounted to the support 14. Mounting the access point 22 to the support 14 is achieved using any known mounting technique such as brackets and screws, etc.

While the embodiments of the present invention have been described with respect to the conference table illustrated in FIGS. 1 and 2, it will be appreciated that the present invention is not limited to the conference table of FIGS. 1 and 2, but is equally applicable to conference tables of any configuration and structure.

Additionally, the present invention is not limited in application to conference tables. Instead, the present invention is readily applicable to any furniture piece such as a desk, credenza, etc.

The invention being thus described, it will be obvious that the same may be varied in many ways. Such variations are not to be regarded as a departure from the spirit and scope of the invention, and all such modifications are intended to be included within the scope of the following claims.

I claim:

1. A furniture piece facilitating wireless Local Area Network (LAN) access, comprising:

a work surface;

at least one support supporting the work surface;

an antenna disposed in the furniture piece; and an access point of the wireless LAN, connected to the antenna, the access point disposed in the furniture piece.

2. The furniture piece of claim 1, wherein the antenna is embedded in the work surface.

3. The furniture piece of claim 1, wherein the antenna is embedded in the support.

4. The furniture piece of claim 1, wherein the access point is disposed in one of the work surface and the support.

5. The furniture piece of claim 4, wherein the access point is embedded in the work surface.

6. The furniture piece of claim 4, wherein the access point is embedded in the support.

7. The furniture piece of claim 1, wherein the work surface is a community work surface.

8. The furniture piece of claim 4, wherein the antenna is embedded in the work surface; and the access point is embedded in the support.

9. The furniture piece of claim 4, wherein the access point is accessible for servicing and repair.

10. The furniture piece of claim 1, wherein the antenna is accessible for servicing and repair.

11. A conference table, comprising:

a community work surface;

at least one support supporting the work surface;

an antenna disposed in the conference table; and an access point of the wireless LAN, connected to the antenna, the access point disposed in the conference table.

12. The conference table of claim 11, wherein the antenna is embedded in the work surface.

13. The conference table of claim 11, wherein the antenna is embedded in the support.

14. The furniture piece of claim 11, wherein the access point is disposed in one of the work surface and the support.

15. The conference table of claim 14, wherein the access point is embedded in the work surface.

16. The conference table of claim 14, wherein the access point is embedded in the support.

17. The conference table of claim 14, wherein the antenna is embedded in the work surface; and the access point is embedded in the support.

18. The conference table of claim 14, wherein the access point is accessible for servicing and repair.

19. The conference table of claim 11, wherein the antenna is accessible for servicing and repair.

* * * * *